Dec. 3, 1963     C. S. MORRISON ETAL     3,112,752
CORN HARVESTER HAVING REPLACEABLE TREATING UNITS
Filed June 26, 1961     5 Sheets-Sheet 1

INVENTOR.
C.S. MORRISON, F.D. JONES &
J.D. WILKINS
BY
William A. Murray
ATTORNEY INVENTORS
C.S. MORRISON, F.D. JONES &
J.D. WILKINS
BY William A. Murray
ATTORNEYS INVENTOR.
C. S. MORRISON, F. D. JONES &
J. D. WILKINS
BY William A. Murray
ATTORNEY

United States Patent Office 3,112,752
Patented Dec. 3, 1963

3,112,752
CORN HARVESTER HAVING REPLACEABLE
TREATING UNITS
Charles S. Morrison, Frank D. Jones, and James D. Wilkins, all of Moline, Ill., assignors to Deere & Company, Moline, Ill., a corporation of Delaware
Filed June 26, 1961, Ser. No. 127,780
5 Claims. (Cl. 130—5)

This invention relates to a crop treating unit. Still more particularly it relates to a self-propelled crop treating unit.

The primary object of the present invention is to provide a completely self-propelled and self-contained crop treating unit which will operate in conjunction with a corn harvester or picker head to both harvest the ears of corn and to treat the ears of corn in one pass over the field.

It is still a further object of the invention to provide a self-propelled corn treating unit which is adaptable to have a plurality of different types of treating units. For example, it is contemplated that the present crop treating unit may be easily and readily converted between a unit which features husking mechanism, a unit which features shelling mechanism, or one which features such mechanism as a milling unit or shredder unit.

Specifically it is proposed to provide a self-propelled crop treating unit having a main mobile frame with its own power source provided for driving the frame over a field. Also mounted on the frame is an elongated upright housing structure which opens forwardly to receive the ears of corn from the harvester and also opens rearwardly to permit the treated crop to move out of the crop treating unit. Adjacent the forward end of the housing structure there is provided a pair of auger conveyors which feed the ears of corn upwardly and rearwardly to a central area in the housing structure where the ears will gravitate into a crop treating unit. In most instances the main portion of the crop treating unit will be centered rather high in the housing structure and consequently movement of the ears of corn and particularly the treated corn will operate primarily by gravity. It is proposed to mount tracks on the side of the housing structure facing internally which receives guides on the crop treating mechanism so that the crop treating mechanism may be inserted or withdrawn from the housing structure through the rear opening. If it should, for example, be desired to merely husk the ears of corn, it would be a simple matter of sliding a husking bed along the tracks in position to receive the ears from the inclined augers. Should it be desired to shell or otherwise reduce the ears of corn, it would be only a simple matter to slide the sheller or reducing unit into the housing structure so as to receive corn from the inclined augers.

Other objects and advantages of the present invention will become apparent to those skilled in the art as the nature of the invention is better understood from the following description and as shown in the accompanying drawings.

FIG. 7 is a sectional view taken substantially along the line 7—7 of FIG. 6.

Figure 1:
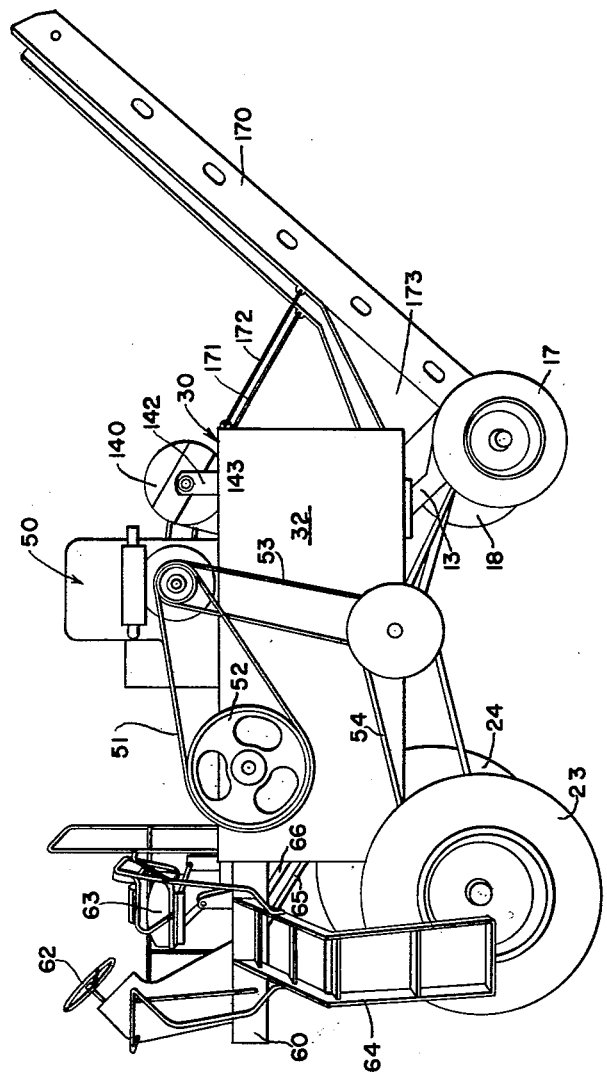
FIG. 1 is a perspective view taken from one side of the crop treating unit.
Figure 2:
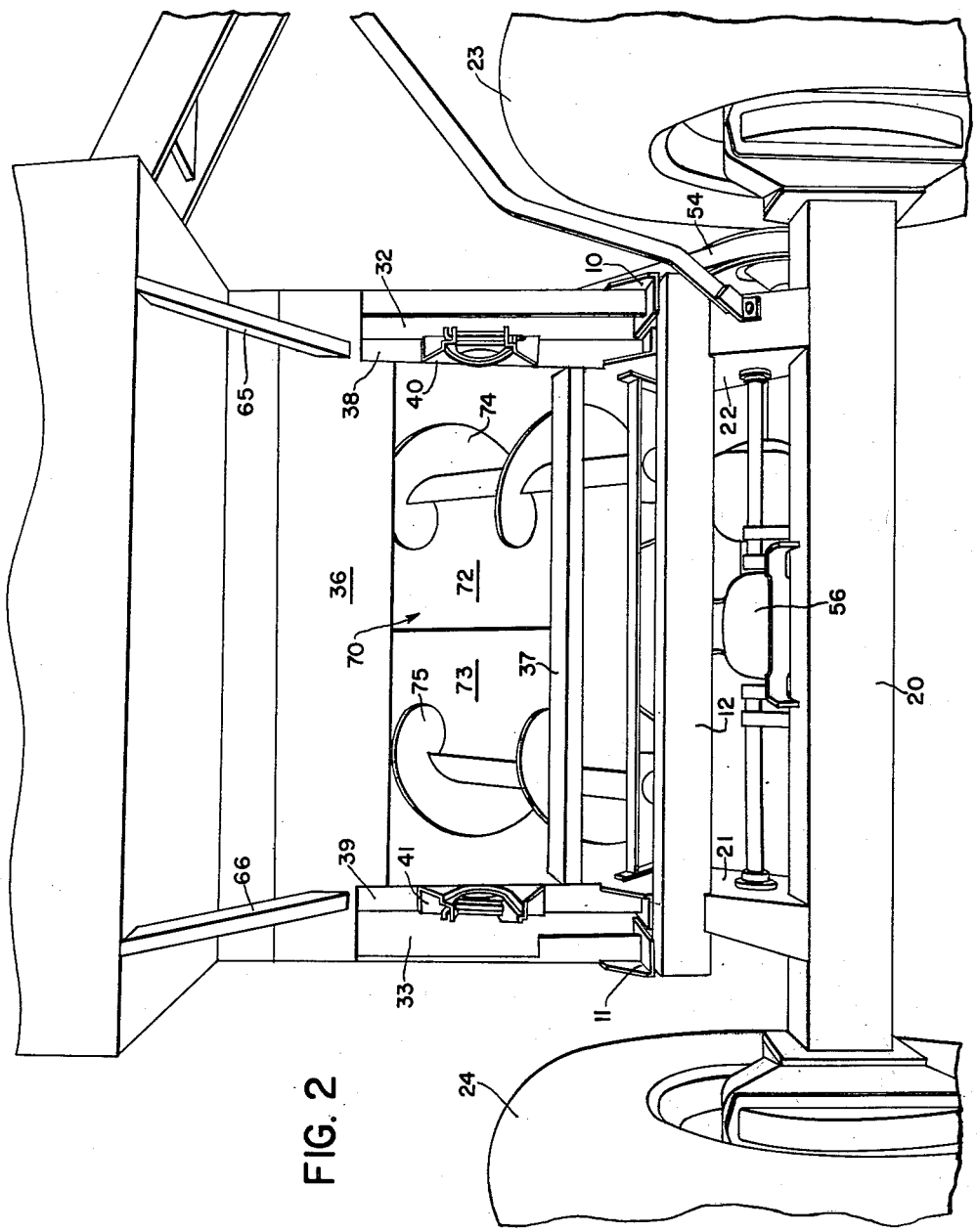
FIG. 2 is an enlarged front perspective view of the front of the crop treating unit.

The unit includes a main frame having fore-and-aft extending transversely spaced left- and right-hand angle iron side beams 10, 11 interconnected at their forward end by a transverse beam 12 and at their rear end by a transverse structure 13. The structure 13 has opposite ends welded to pads 14, 15 which in turn are welded to the fore-and-aft extending angle iron side beams 10, 11. At the lower rear end of the rigid structure 13 there is fixed a transverse axle 16 which carries at opposite ends thereof a pair of steerable wheels 17, 18 respectively. The forward transverse beam 12 is carried on a transverse axle structure 20 by structural columns 21, 22 fixed to the top of the axle structure 20 and to the underside of the transverse beam 12. On the opposite ends of the axle structure 20 are provided left- and right-hand main traction wheels 23, 24.

A fore-and-aft extending housing structure, indicated in its entirety by the reference numeral 30, is supported on the side beams 10, 11. The housing structure 30 includes a horizontally disposed top wall or panel 31 and oppositely disposed side panels 32, 33. Corner braces, such as at 34, 35, are provided to join the top wall 31 to the side walls 32, 33 and serve as structural support for the entire housing structure. The housing structure 30 is completely open at its rear and is generally open at its forward end although a front transverse panel 36 extends part way down the forward portion of the housing structure 30. A reinforcing transverse bar 37 is spaced downwardly from the lower edge of the transverse panel 36 and forms therewith a material inlet. The inlet opening is closed at its sides by a pair of beam structures 38, 39 which have forwardly opening trunnion blocks 40, 41. The trunnion blocks 40, 41 are for the purpose of receiving the rear trunnions of a conventional type harvesting header, not shown, but generally of the type shown in U.S. Patent 2,794,307 which issued to Morrison et al. on June 4, 1957. Other types of headers would, of course, operate satisfactorily if they would or could be adjusted to mount on the trunnion blocks 40, 41.

Mounted on top of the overhead panel 31 is a motor, indicated in its entirety by the reference numeral 50. The motor 50 has a series of drives extending therefrom such as a belt drive 51 extending over a driven pulley 52 which in turn operates a main driveshaft for the crop treating mechanism of the present invention. Also, the motor has a belt drive 53 extending downwardly to a countershaft which drives a second belt drive 54. The drive 54 extends to a transverse shaft, not shown, which extends inwardly to a differential 56 centrally between the traction wheels 23, 24 and which is mounted on the axle structure 20. Suitable drive transmission is provided in the differential 56 to provide positive drive on the wheels 23, 24. Generally the exact nature of the drive to the wheels as to the mechanism contained in the crop treating unit is not of major importance relative to the present invention. Consequently such has been described only in general terms. Projecting forwardly from the housing structure 30 is an operator's platform 60 with steering mechanism 62 and an operator's seat 63 mounted thereon. A ladder such as at 64 is provided for ascent and descent relative to the platform 60. A pair of upwardly inclined braces 65, 66 extends upwardly from the upright frame members 38, 39 at the front of the housing 30 to the underside of the platform 60.

As may be concluded therefore, the entire crop treating unit is self-contained or self-operated. All power required for the unit is supplied by the main engine 50 and the means for steering and operating the entire unit is provided by levers, not shown, adjacent the operator's station. Disposed between the side walls 32, 33 and adjacent the forward end of the structure 30 is laterally disposed panel structure 70 which is formed into a pair of auger troughs 72, 73 inclined from lower ends directly beneath the crop inlet or the transverse brace 37 upwardly and rearwardly to a rear end substantially midway between opposite ends of the housing structure 30. Supported in the auger troughs 72, 73 are a pair of parallel augers 74, 75 which will auger material upwardly and rearwardly over the upper end of the auger troughs 72, 73. The lower end of the troughs 72, 73 are so positioned that material passing through the inlet between the lower edge of the panel 36 and the cross brace 37 will be received in the auger troughs for movement into the crop treating unit herein to be explained.

Figure 3:
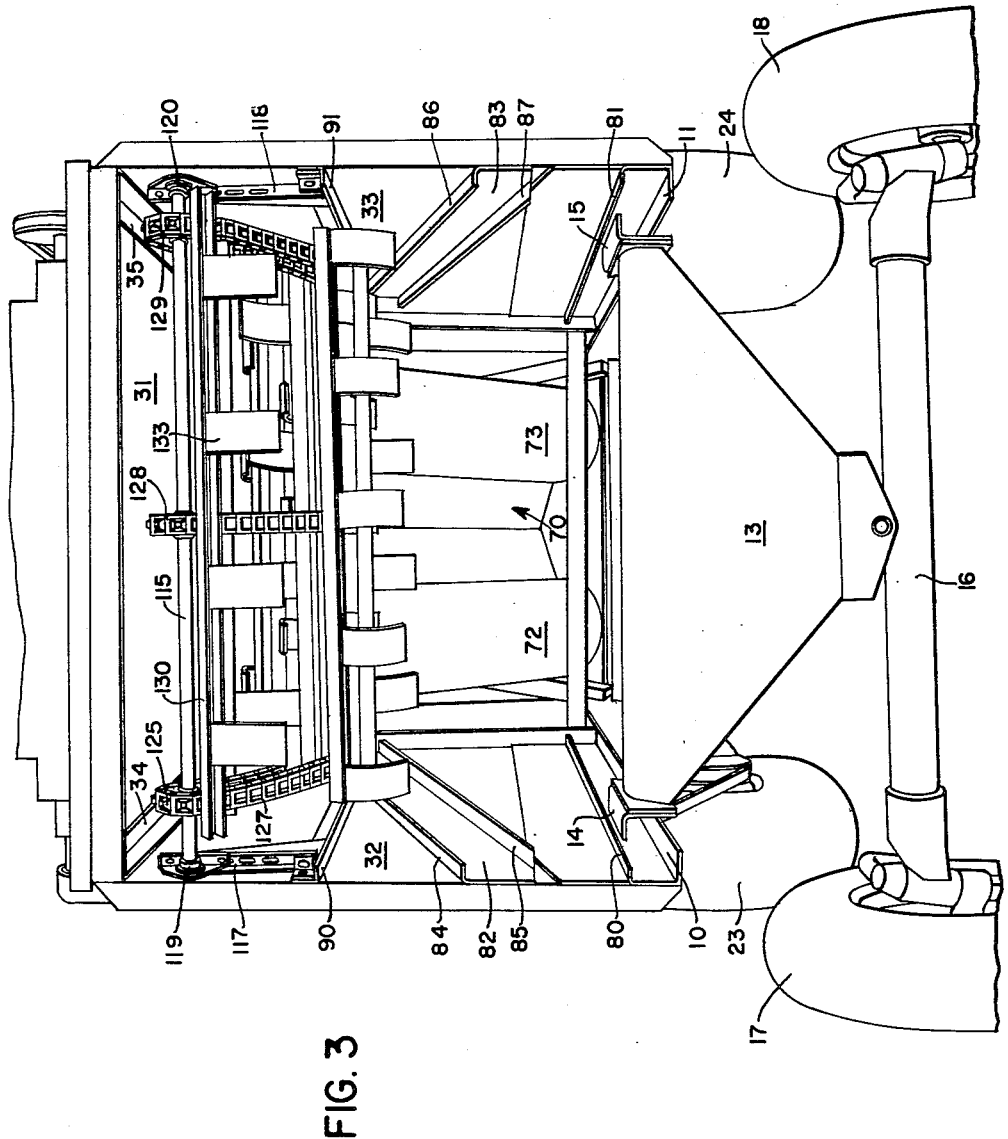
FIG. 3 is an enlarged rear perspective view of the unit with a portion of the treating mechanism partially installed.

Referring now specifically to FIG. 3, the upper edges of the side beams 10, 11 are flanged inwardly at 80, 81 to define fore-and-aft extending tracks on opposite sides of the housing structure 30. Above the tracks 80, 81 are a pair of U-shaped channels 82, 83 which face inwardly so that the flanges of the upper and lower flanges 84, 85 and 86, 87 respectively form additional tracks on opposite sides of the housing structure 30. The channels 82, 83 are inclined from the rear to their front end and are fixed in any suitable manner to their respective walls or supports. Above the channels 82, 83 are fore-and-aft extending angle iron members 90, 91. The flanges of the angle iron members 90, 91 extend inwardly and when completely inserted in the housing structure will rest on the upper flanges 84, 86 (see FIG. 5).

Figure 4:
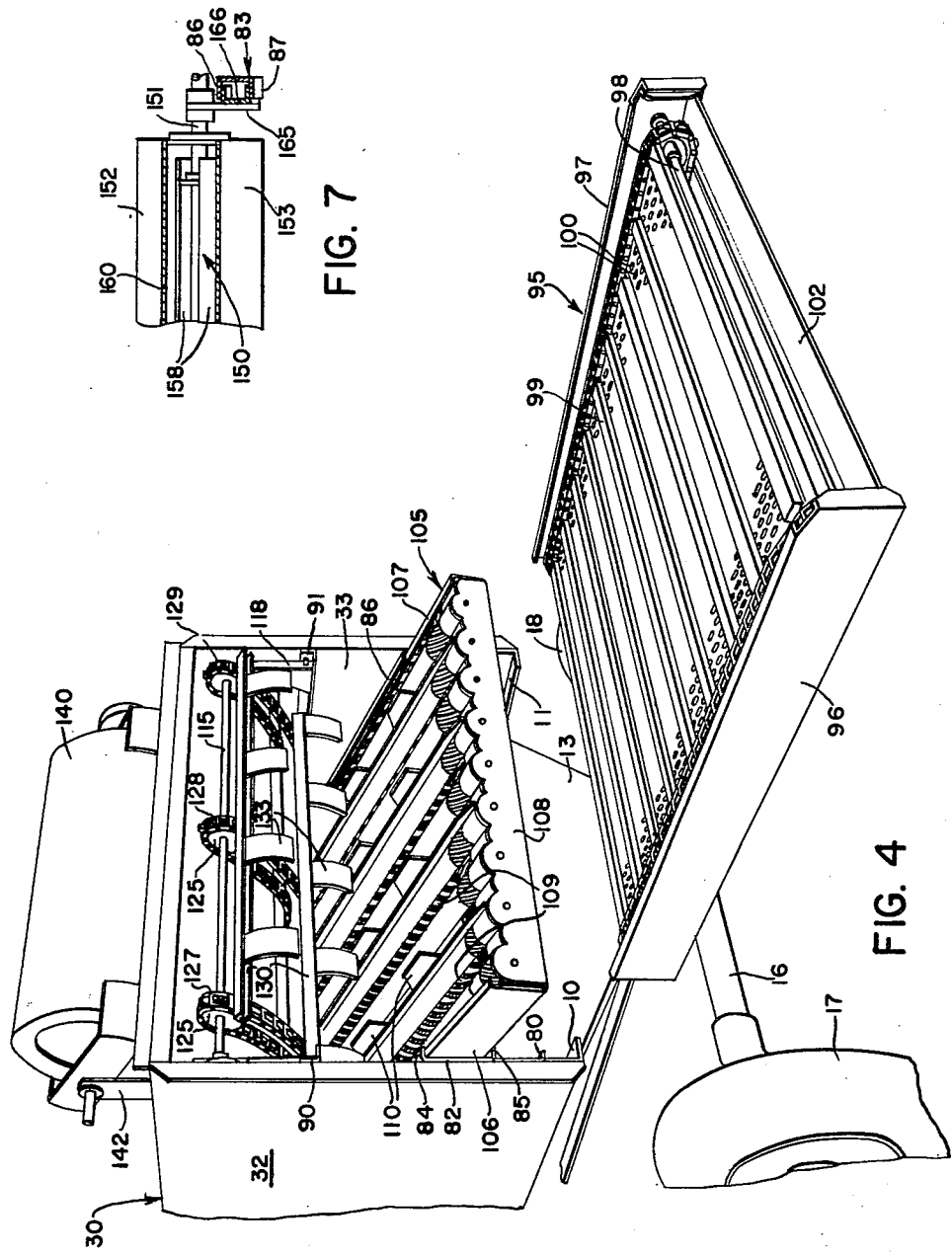
FIG. 4 is an enlarged rear and side perspective view of the rear portion of the crop treating unit with the crop treating mechanism shown in different stages of withdrawal from the housing structure.

Referring now to FIG. 4, there is provided on the lower tracks 80, 81 a husk conveyor 95. The husk conveyor 95 is composed of a pair of fore-and-aft extending side beams 96, 97 which support sprocket shafts at opposite ends. The sprocket shafts carry sprockets which in turn cause to rotate a continuous slatted type conveyor 99. The conveyor 99 has small openings 100 therein through which kernels of corn may pass. The entire conveyor bed 95 is therefore supported by the side beams 96, 97. The beams 96, 97 operate as guides and may be inserted above the tracks 81, 81 so as to be completely inserted within the housing structure 30. The husk conveyor has a lower floor panel 102 which is disposed beneath the lower run of the continuous slat-type conveyor 99 and collects the kernels of corn which pass through the conveyor. The slats on the conveyor then drive the kernels over the floor 102 rearwardly to be discharged over the rear edge of the floor. The upper run of the slat type conveyor 99 moves trash forwardly over the floor 100 through a trash opening adjacent the front of the unit.

Figure 5:
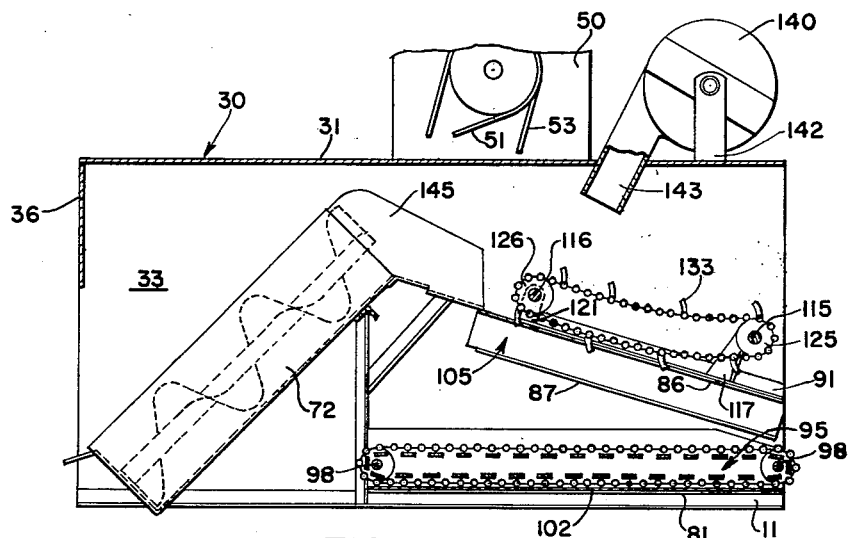
FIG. 5 is an enlarged schematic view showing the crop treating mechanism completely installed in the housing structure.

A husking mechanism, indicated by the reference numeral 105 is disposed normally above the conveyor 95. The husking mechanism 105 includes a main frame structure having oppositely disposed side plates 106, 107. A rear end plate 108 connects the rear edges of the side plates 106, 107. A forward end plate, not shown, connects the forward edges. Extending between the end plates are a series of parallel husking rolls 109 and a series of ear straightening devices 110. The husking rolls 109 and ear straighteners 110 are generally of conventional nature and are described only generally. The side plates 106, 107 have a height closely equal to the distance between the flanges 84, 85 and 86, 87 respectively. Consequently the entire husking bed 105 may be inserted between the flanges or tracks and may be slid into an inclined position. FIG. 4 shows the husking bed only partially inserted in the housing structure 30. In operation, the husking bed will be completely inserted, as indicated in FIG. 5, and the plate 108 will generally be in alignment with the rear end of the housing structure.

An ear conveyor is disposed above the husking bed 105 and is composed of a pair of transverse shafts 115, 116 which extend across the housing structure 30 to points adjacent the walls 32, 33. Upright rigid elements 117, 118 are bolted to the tracks 90, 91 and extend upwardly therefrom. The upper ends carry bearing blocks 119, 120 which support opposite ends of the shaft 115. Similar supporting structure for the shaft 116, and indicated at 121 (FIG. 5), support the forward shaft 116 on the angle irons 90, 91. As shown in FIGS. 3 and 4 the entire ear conveyor mechanism is raised at its rear end as would occur when it is being inserted or withdrawn from the housing. Normally it will rest on the upper flanges or tracks 84, 86 as is shown in FIG. 5. The conveyor as is conventional, is composed of a series of sprockets, such as at 125 on the shaft 115 and 126 on the shaft 116, which carry transversely spaced chains 127, 128, 129. The chains in turn carry a series of longitudinally spaced transverse slats or bars 130 which have fixed thereto rubber or flexible flaps 133. The flaps 133 contact the ears and gently moves them downwardly over the husking bed.

While the entire crop treating unit is being used for husking corn, additional structure such as a blower 140 is supported on the top wall 31 by means of upwardly projecting supporting structure 142. The blower 140 has a downwardly directed discharge duct 143 which directs the flow of air toward the husking mechanism 105 to aid in removal of the husks and for removal of minute trash from the husking bed. Also incidental with the husking unit is a hood structure 145 which is mounted adjacent the rear or discharge end of the main auger feeding mechanism 70 and operates to guide the ears of corn onto the upper end of the husking bed 105. The hood 145 may be removed and it is also supported on the super structure of the housing 30. In this respect, the entire husking or crop treating mechanism including the conveyor 95, the husking unit 105, and the ear conveyor above the husking unit 105 may be removed. Consequently an operator may be capable of moving within the housing 30 for removing and placing the hood 145.

Figure 6:
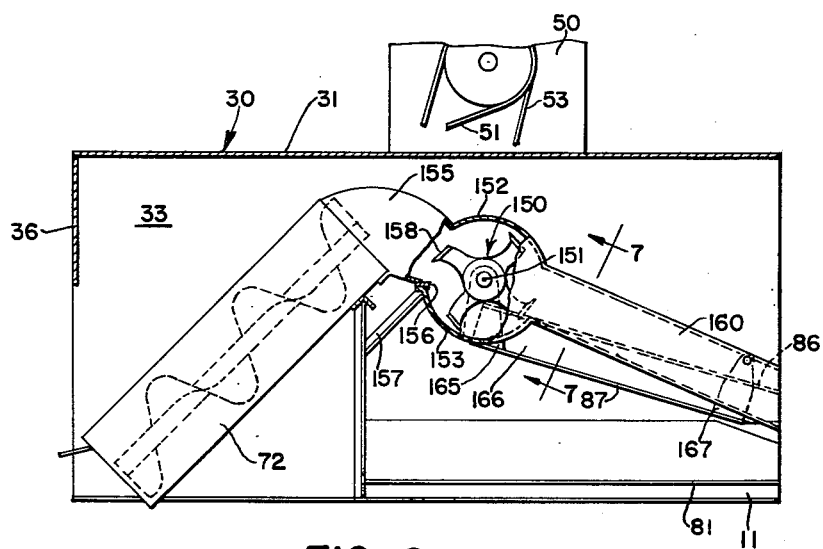
FIG. 6 is an enlarged schematic view showing a second type of treating mechanism in the housing structure.

As mentioned previously, it is contemplated that the crop treating unit is so constructed that various types of crop treating mechanism may be placed within the housing 30 and in a position to receive the crops from the forward conveyor 70. FIGURES 6 and 7 show a diagrammatic representation of a second type of crop treating unit placed in the housing structure 30. As may be seen from viewing FIG. 6, the entire husking mechanism is removed although the tracks at 86, 87 and 81 are retained in their fixed relation to the side wall 33. Supported between the tracks 84, 85 and 86, 87 is a roughage mill composed of a main rotor 150 supported on a main drive shaft 151. Above and below the rotor 150 is a pair of semi-cylindrical panels 152, 153 respectively. The transverse panels 152, 153 have forwardly disposed and spaced apart edges which form an inlet for receiving corn from the auger conveyor 70, a hood 155 being provided to guide the materials into the rotating rotor 150. A cutterbar 156 is fixed by supporting structure 157 to the housing 30 and cooperates with cutter blades 158 on the rotor 150. Consequently as corn is fed over the cutter bar 156, it is chopped or reduced by the rotor mechanism. The rear terminal edges of the panels 152, 153 are integral or rigid with a downwardly and rearwardly directed discharge chute 160 which receives the reduced corn and permits it to gravitate downwardly and rearwardly.

Opposite ends of the rotor shaft 151 are supported by vertically disposed brackets, one of which is shown at 165. The lower end of the bracket 165 is rigidly connected with the web portion of an outwardly extending U-shaped channel member 166. The flanges of the channel 166 project outwardly and fit adjacent and between the inwardly projecting track portions 86, 87 of the channel 83. The channel 166 extends substantially the entire length of the channel member 83 and consequently the chanel 166 may be moved fore and aft relative to the channel 83. At the rear end of the discharge chute 160 there is provided a bracket structure 167 which is mounted in a similar manner to the chute 160 and to the channel 166. A similar arrangement is provided for supporting the left end of the rotor shaft 151 and the left side of the chute 160 to the channel 82 fixed on the left side wall 32. Since the structure is substantially identical, it is believed it is not necessary to further elaborate on the details. As is clearly evident, however, it is possible to remove or replace the entire rotor structure including the panels 152, 153 and the discharge chute 160 merely by moving the entire structure along the channel tracks 82, 83.

It should, of course, be recognized that other types of crop treating mechanisms, such as sheller units, could be easily adapted for insertion within the housing 30. While the other types of crop treating mechanisms are not shown, it would appear obvious that such substitution could readily be applied.

Also mounted on the crop treating mechanism is a rearwardly projecting discharge elevator 170. The elevator 170 is carried on the structure 13 at its lower end and has tie rods 171, 172 connecting it to the upper end of the housing structure 30. At the lower end of the elevator 170 there is provided a hopper 173 which is positioned to receive the treated materials discharging from the rear end of the housing structure 30.

While only two forms of the invention have been shown it should be recognized that other forms and variations will occur to those skilled in the art. Therefore it should be understood that while the present forms were shown and described in a detailed manner, it was the purpose in so doing to concisely and completely illustrate the principles of the invention, and it was not the intention to limit or narrow the invention beyond the broad concepts set forth in the appended claims.

What is claimed is:

1. A crop treating unit comprising: a main mobile frame; a fore-and-aft extending elongated housing structure supported on the frame having relatively low forward crop intake inlet opening forwardly and a rear crop discharge outlet opening rearwardly, said housing structure further having a pair of oppositely disposed upright side walls; laterally disposed inclined panel structure supported in the housing structure between the side walls and extending from a relatively low end adjacent the crop inlet upwardly and rearwardly to a rear end midway between the inlet and outlet of the housing structure, the inclined panel structure defining a pair of fore-and-aft extending auger troughs; a pair of parallel fore-and-aft augers within the auger troughs adapted to move crops upwardly and rearwardly to the rear end of the panel structure; a plurality of vertically spaced track means supported on opposite side walls rearwardly of the panel structure terminating adjacent the discharge outlet; a crop treating device having guide means engageable with upper track means to permit insertion and withdrawal of said device from the housing structure, said device being disposed immediately adjacent the uppermost end of the inclined panel structure when fully inserted to receive crops from the forward augers, the others of said vertically spaced track means being adapted to removably receive other crop treating devices.

2. A crop treating unit comprising: a main mobile frame; a fore-and-aft extending elongated housing structure supported on the frame having a forward inlet and a rear discharge outlet; laterally disposed inclined panel structure supported in the housing structure extending from the crop inlet to a rear end between the inlet and outlet of the housing structure, the panel structure defining conveyor trough means; flight type conveyor means supported on the trough adapted to move crops upwardly and rearwardly to the rear end of the panel structure; a plurality of vertically spaced crop treating mechanisms normally disposed within the housing structure rearwardly of the rear edge of the panel structure and the uppermost device being adapted to receive crops from the conveyor means and effective to move crops rearwardly to the crop outlet; and a plurality of vertically spaced fore-and-aft extending track and guide means supporting the crop treating mechanisms within the housing structure effective to permit insertion and withdrawal of the crop treating mechanisms from the housing structure.

3. A crop treating unit comprising: a main mobile frame; a fore-and-aft extending elongated housing structure supported on the frame having a relatively low forward crop intake inlet opening forwardly and a rear crop discharge outlet opening rearwardly, said housing structure further having a pair of upright side walls; laterally disposed inclined panel structure supported in the housing structure between the side walls and extending from a relatively low end adjacent the crop inlet upwardly and rearwardly to a rear end midway between the inlet and outlet of the housing structure, the inclined panel structure defining a pair of fore-and-aft extending auger troughs; a pair of parallel fore-and-aft augers within the auger troughs adapted to move crops upwardly and rearwardly to the rear end of the panel structure; a plurality of vertically spaced and fore-and-aft extending tracks supported on the respective side walls rearwardly of the panel structure; a plurality of vertically spaced devices defining crop treating mechanism adapted for normal disposition within the housing structure rearwardly of the rear edge of the panel structure and the uppermost device adapted to receive crops from the forward augers; and guide means on the devices for engaging at least part of the tracks and effective to permit insertion and withdrawal of each of the devices from the housing structure.

4. The invention set forth in claim 3 in which said tracks terminate adjacent the outlet of the housing structure.

5. A crop treating unit comprising: a main mobile frame; a fore-and-aft extending elongated housing structure supported on the frame having a forward inlet and a rear discharge outlet; laterally disposed inclined panel structure supported in the housing structure extending from the crop inlet to a rear end between the inlet and outlet of the housing structure, the panel structure defining conveyor trough means; flight type conveyor means supported on the trough adapted to move crops upwardly and rearwardly to the rear end of the panel structure, a plurality of vertically spaced and fore-and-aft extending track means supported internally of the housing structure, a crop treating device having guide means engageable with upper track means to permit insertion and withdrawal of said device from the housing structure, said device being disposed immediately adjacent the uppermost end of the inclined panel end of the inclined panel structure when fully inserted to receive crops from the conveyor means, the others of said vertically spaced track means being adapted to removably receive other crop treating devices.

References Cited in the file of this patent

UNITED STATES PATENTS

| | | |
|---|---|---|
| 2,337,592 | Coultas et al. | Dec. 28, 1943 |
| 2,651,158 | Richardson | Sept. 8, 1953 |
| 2,670,845 | Busack et al. | Mar. 2, 1954 |
| 2,862,536 | Gronberg | Dec. 2, 1958 |